United States Patent
Surazski et al.

(10) Patent No.: US 8,494,539 B1
(45) Date of Patent: Jul. 23, 2013

(54) CONGESTION MANAGEMENT IN RADIO ACCESS NETWORKS

(75) Inventors: Mieczyslaw Juliusz Surazski, Ottawa (CA); Luc Noiseux, Verdun (CA); Mauro Jose Galarda Martins, Kanata (CA)

(73) Assignee: Alcatel Lucent, Paris (FR)

(*) Notice: Subject to any disclaimer, the term of this patent is extended or adjusted under 35 U.S.C. 154(b) by 1107 days.

(21) Appl. No.: 11/169,948

(22) Filed: Jun. 30, 2005

(51) Int. Cl.
- *H04W 72/00* (2009.01)
- *H04W 24/00* (2009.01)
- *H04W 4/00* (2009.01)
- *H04B 7/00* (2006.01)
- *H04B 1/38* (2006.01)

(52) U.S. Cl.
USPC ........ 455/452.2; 455/123; 455/524; 455/560; 370/338

(58) Field of Classification Search
USPC ................ 370/229, 235, 237, 338, 401, 241, 370/252, 395.41, 395.43, 468; 455/453, 452.2, 455/522, 524, 560, 561
See application file for complete search history.

(56) References Cited

U.S. PATENT DOCUMENTS

| | | | |
|---|---|---|---|
| 6,829,217 B1 * | 12/2004 | Bechtolsheim et al. | 370/229 |
| 2002/0141332 A1 * | 10/2002 | Barnard et al. | 370/218 |
| 2002/0160777 A1 * | 10/2002 | Takao et al. | 455/436 |
| 2004/0105393 A1 * | 6/2004 | Ronneke et al. | 370/252 |
| 2005/0013287 A1 * | 1/2005 | Wallentin et al. | 370/352 |
| 2005/0044206 A1 * | 2/2005 | Johansson et al. | 709/224 |
| 2005/0208960 A1 * | 9/2005 | Hassan | 455/522 |
| 2005/0262266 A1 * | 11/2005 | Wiberg et al. | 709/238 |
| 2006/0067298 A1 * | 3/2006 | Houck et al. | 370/352 |
| 2006/0159016 A1 * | 7/2006 | Sagfors et al. | 370/230 |
| 2006/0164986 A1 * | 7/2006 | Rinne | 370/231 |
| 2006/0227736 A1 * | 10/2006 | Conyers et al. | 370/328 |
| 2006/0268788 A1 * | 11/2006 | Harris et al. | 370/335 |

* cited by examiner

*Primary Examiner* — George Eng
*Assistant Examiner* — Inder Mehra
(74) *Attorney, Agent, or Firm* — Sughrue Mion, PLLC

(57) ABSTRACT

A method for congestion management in a radio access network is provided. The radio network controller maintains available bandwidth information for each of the downstream links towards the base stations. The radio network controller also measures incoming traffic for each such link and for various traffic classes and uses the traffic measurements and available bandwidth to predict congestion conditions. Upon detecting a congestion condition, congestion avoidance mechanisms such as controlled discard and back-pressure are activated.

21 Claims, 3 Drawing Sheets

CONGESTION MANAGEMENT IN RADIO ACCESS NETWORKS

FIELD OF THE INVENTION

The invention relates to traffic management in radio access networks.

BACKGROUND OF THE INVENTION

Some current UTRAN (UMTS terrestrial radio access network) architectures include high speed links between an RNC (radio network controller) and an ATM (asynchronous transfer mode) ATM network, and then lower speed links between the ATM network and each base station (BTS). The interface between the RNC all the way to the base station, including the ATM switch, is referred to as the Iub. Various types of traffic that are supported include delay sensitive (DS) typically consisting of circuit switched services such as voice, NDS (non delay sensitive) that is less delay sensitive than DS but not entirely insensitive to delay and typically used in the packet switched domain, and HSDPA (high speed downlink packet access) that is typically not particularly sensitive to delay, also used in the packet switched domain. BTSs have a "receive window" for each traffic stream that defines a period within which each packet is expected. The window for DS traffic is smaller than that for NDS and HSDPA traffic. For example, the receive window for DS traffic might be 5 ms, the receive window for NDS traffic might be 50 ms, and there might be no window for HSDPA traffic.

Call admission control is used to limit the amount of new streams/services that are added to the network. This approach can be used to guarantee there is enough bandwidth for DS traffic that is deterministic in nature. However, existing systems do not provide for congestion management. Congestion can result due to the fact that the high speed link from the RNC to the ATM switch can handle more traffic than the links to the BTSs.

If the traffic is too early or too late, for certain traffic types, the BTS simply drops (i.e. discards) the traffic thereby wasting available bandwidth on the lower speed links. More generally, each RAB (Radio Access Bearer) type may behave differently in the presence of congestion. For DS RABs, no congestion is expected because typically call admission control is structured to ensure this. For NDS RABs, when there is congestion, transport frames are discarded at the base station due to missed receive windows and this results in wasted Iub bandwidth, increased RNC processing due to RLC retransmits etc. For HSDPA RABs, congestion results in increased delay and sporadic periods of inactivity/stalling due to queue overflow discards and subsequent RLC retransmits.

SUMMARY OF THE INVENTION

According to one broad aspect, the invention provides a method for managing congestion in a network comprising an RNC (radio network controller) and a plurality of a base stations over links comprising at least one respective link that is remote from the RNC for each base station, the method comprising: measuring incoming traffic for each base station at the RNC for a plurality of traffic classes to produce traffic measurements; for each base station, determining a total bandwidth available on the at least one respective link to the base station; for each base station, detecting presence or absence of congestion condition using the traffic measurements for the base station and the total available bandwidth for the base station; and upon detecting a congestion condition, performing congestion avoidance at the RNC.

In some embodiments, for each base station, determining a total bandwidth available on the at least one respective link to the base station is done upon occurrence of an event that effects the bandwidth available.

In some embodiments, measuring incoming traffic for each base station at the RNC for a plurality of traffic classes to produce traffic measurements comprises: for each incoming packet, determining which link the packet will be transmitted on, and determining a traffic class for the packet, and incrementing a counter for the determined traffic class and link.

In some embodiments, the method further comprises converting a size of the packet to a cell count, and incrementing a counter by the cell count.

In some embodiments, the traffic classes comprise DS (delay sensitive), NDS (non delay sensitive), and HSDPA (High speed downlink packet access).

In some embodiments, determining a respective bandwidth available on each link comprises: adding up capacities of all active VCCs on the link.

In some embodiments, adding up capacities of all active VCCs on the link comprises computing:

$$LB = (T_{update}/1\,s)\Sigma(VCC_{ECR}) \text{ where } VCC_{ECR} = 2*(PCR*SCR)/(PCR+SCR).$$

where $T_{update}$ is the update interval, and PCR is a peak cell rate of a given active VCC, and SCR is a sustained cell rate of a given active VCC.

In some embodiments, for each base station detecting presence or absence of congestion conditions using the traffic measurements for the base station and available bandwidth for the base station comprises: every update period, updating the traffic measurements to reflect traffic that has been transmitted, comparing traffic balances of traffic classes or combinations of classes to respective thresholds.

In some embodiments, every update period, updating the traffic measurements to reflect traffic that has been transmitted, comparing traffic balances of traffic classes or combinations of classes to respective thresholds comprises: comparing traffic balances of each of: a) highest priority traffic; b) sum of traffic of top two priorities; c) sum of traffic of top three priorities; to a respective at least one threshold.

In some embodiments, the respective at least one threshold comprises a discard threshold.

In some embodiments, the respective at least one threshold comprises a back-pressure thresholds.

In some embodiments, the respective at least one threshold comprises a controlled discard threshold and a back-pressure threshold.

In some embodiments, for each base station detecting presence or absence of congestion conditions using the traffic measurements for the base station and available bandwidth for the base station comprises: every update period, updating the traffic measurements for DS, NDS and HSDPA to reflect traffic that has been transmitted; comparing traffic balances of each of: a) DS traffic to a first discard threshold; b) DS+NDS traffic to a second discard threshold and first back-pressure threshold; c) DS+NDS+HSDPA traffic to a third discard threshold and a second back-pressure threshold.

In some embodiments, performing congestion avoidance at the RNC comprises at least one of: performing controlled discards; and applying back-pressure.

In some embodiments, performing controlled discards comprises: discarding all traffic in excess of an exceeded controlled discard threshold.

In some embodiments, applying back-pressure comprises: for a specified time period stopping transmission of a respective traffic type when a back-pressure threshold is exceeded.

According to another broad aspect, the invention provides a radio network controller for performing congestion management of traffic transmitted speed link towards a plurality of a base stations over links comprising at least one respective link that is remote from the RNC for each base station, the radio network controller comprising: a congestion management function comprising: a) a traffic measurement function adapted to measure incoming traffic destined for each base station; b) a bandwidth tracker adapted to track an available bandwidth for transmission to each base station; c) a congestion detector adapted to detect congestion using the traffic measurements and the available bandwidth; d) a congestion avoidance function adapted to, upon detecting a congestion condition on the at least one link to a particular base station, perform congestion avoidance at the RNC.

In some embodiments, the congestion avoidance function is adapted to perform congestion avoidance by applying back-pressure on selected streams for the at least one link upon which a congestion condition has been detected.

In some embodiments, the congestion avoidance function is adapted to perform congestion avoidance by performing controlled discards on selected streams for the at least one link upon which a congestion condition has been detected.

In some embodiments, the congestion avoidance function is adapted to: perform congestion avoidance by applying back-pressure on selected streams for the at least one link upon which a congestion condition has been detected; and perform congestion avoidance by performing controlled discards on selected streams for the at least one link upon which a congestion condition has been detected.

In some embodiments, a UTRAN (UMTS terrestrial radio access network) comprising: the RNC as summarized above; an ATM network; a high speed link interconnecting the ATM network and the RNC; and a plurality of base stations, the at least one respective link interconnecting the ATM network to each of the plurality of base stations.

BRIEF DESCRIPTION OF THE DRAWINGS

Embodiments of the invention will now be described with reference to the attached drawings in which.

DETAILED DESCRIPTION OF THE PREFERRED EMBODIMENTS

Figure 1:
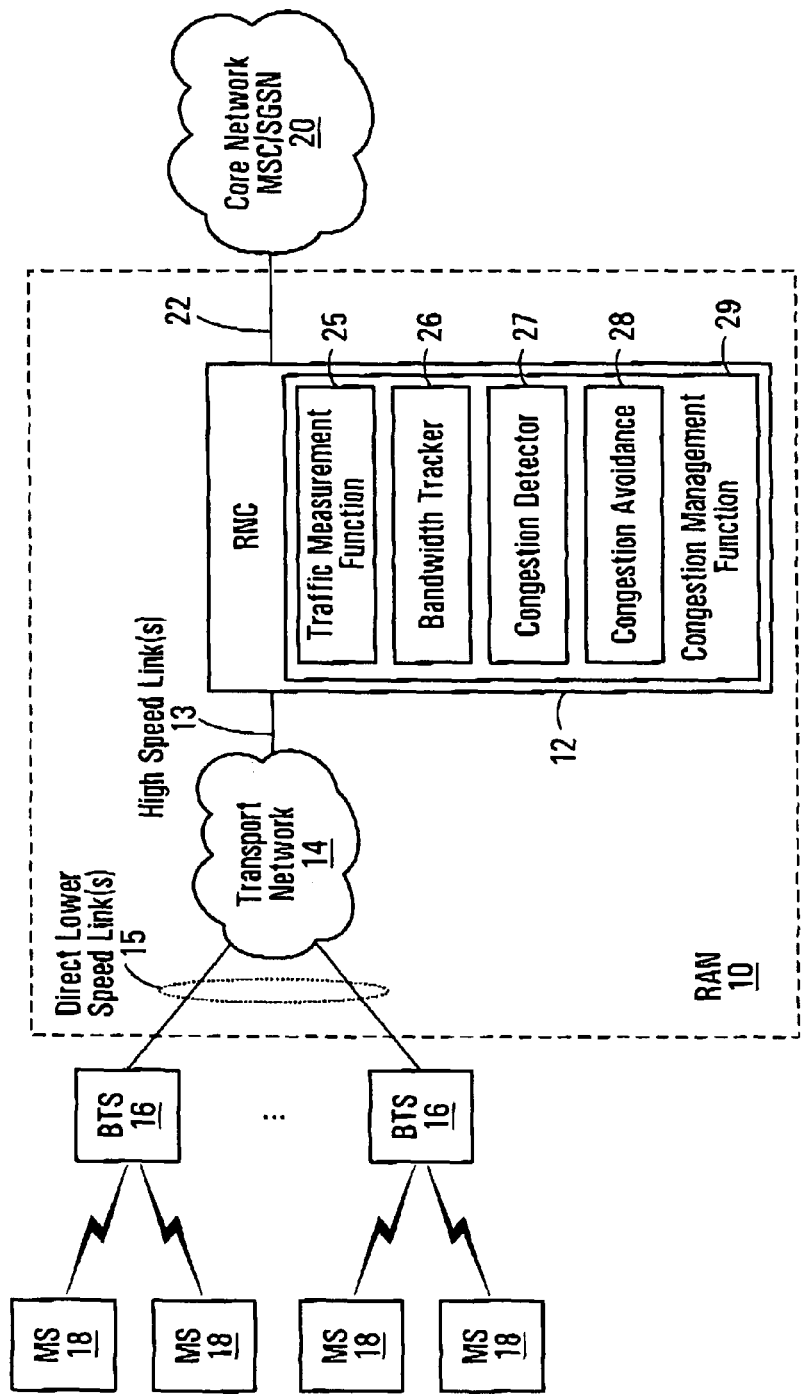
FIG. 1 is a block diagram of a radio access network adapted to perform congestion management.

Referring now to FIG. 1, shown is an example structure of a radio access network (RAN) 10 provided by an embodiment of the invention, consisting of an RNC (radio network controller) 12 connected over a high speed link(s) 13 to a transport network 14. The transport network 14 is connected over respective sets of one or more lower speed direct links 15 to each of a set of base stations (BTS) 16. Each BTS 16 is shown providing wireless access to a respective set of mobile stations (MS) 18. The RNC 12 is also shown connected over one or more high speed links 22 to a core network/MSC (mobile switching centre)/SGSN (Serving GPRS Support Node), or other network element above the RNC 12 in the network hierarchy. Packets for any of the mobile stations 18 are received over the high speed link(s) 22. These might be received in an IP/ATM format for example, but more generally can be any format used by the network. The number and arrangement of BTSs is implementation specific; the number and arrangement of MSs is implementation specific, and typically MSs can move into and out of the coverage area of the system. The transport network 14 is preferably an ATM network, and this is assumed in the example below. Other transport networks can alternatively be employed.

The radio access network might for example be a UTRAN and this is assumed in the remaining description. More generally the solution is applicable to any radio access network that has QoS based traffic prioritization over a transport network. In the context of UTRAN, each RNC→BTS link, including the high speed link and one of the lower speed links is referred to as an Iub.

The high speed link 13 might for example be a STM-1 link or OC-3 link. Each set of lower speed links 15 might for example be DS1/E1 or multiple DS1/E1 aggregated into an IMA (inverse multiplexing over ATM) link. These links have limited bandwidth compared to the high speed link. The particular nature of these links is implementation specific.

In some implementations, the Iub interface traverses an ATM network, and consists of a number of user VCCs with specific Service categories (therefore with specific emission priorities) as discussed above. The detailed examples described herein assume such a configuration. However, the methods are also applicable in other configurations with appropriate modifications as required. For example, in another implementation, the Iub interfaces traverse an ATM Network, and, use shaped VPT/VPC (virtual path terminators/virtual path connection), and limited VCC emission prioritization are available Therefore special traffic descriptors and congestion management thresholds can be defined.

In such a network, in the absence of a congestion management scheme, congestion can occur remote from the RNC 12 on the lower speed links 15 to the BTSs 16 from the transport network 14. However, it is the RNC 12 that has the capacity to control this traffic. As such, a mechanism is provided that anticipates congestion on these lower speed links 15 and that modifies traffic at the RNC so as to avoid the downstream congestion.

The RNC 12 is equipped with several congestion management functions 29 to detect and deal with congestion. These consist of a traffic measurement function 25; a bandwidth tracker 26, a congestion detector 27, and a congestion avoidance function 28. These four functions can be implemented in any appropriate combination of software, hardware, firmware etc. Furthermore, the functionality can be combined into a smaller number of functions or divided into a larger number of functions. The particular functional layout is simply an example. While the congestion management functions 29 are shown in the RNC, more generally they can be implemented in any location or locations that enable them to perform the requisite functionality as described herein.

Figure 2:
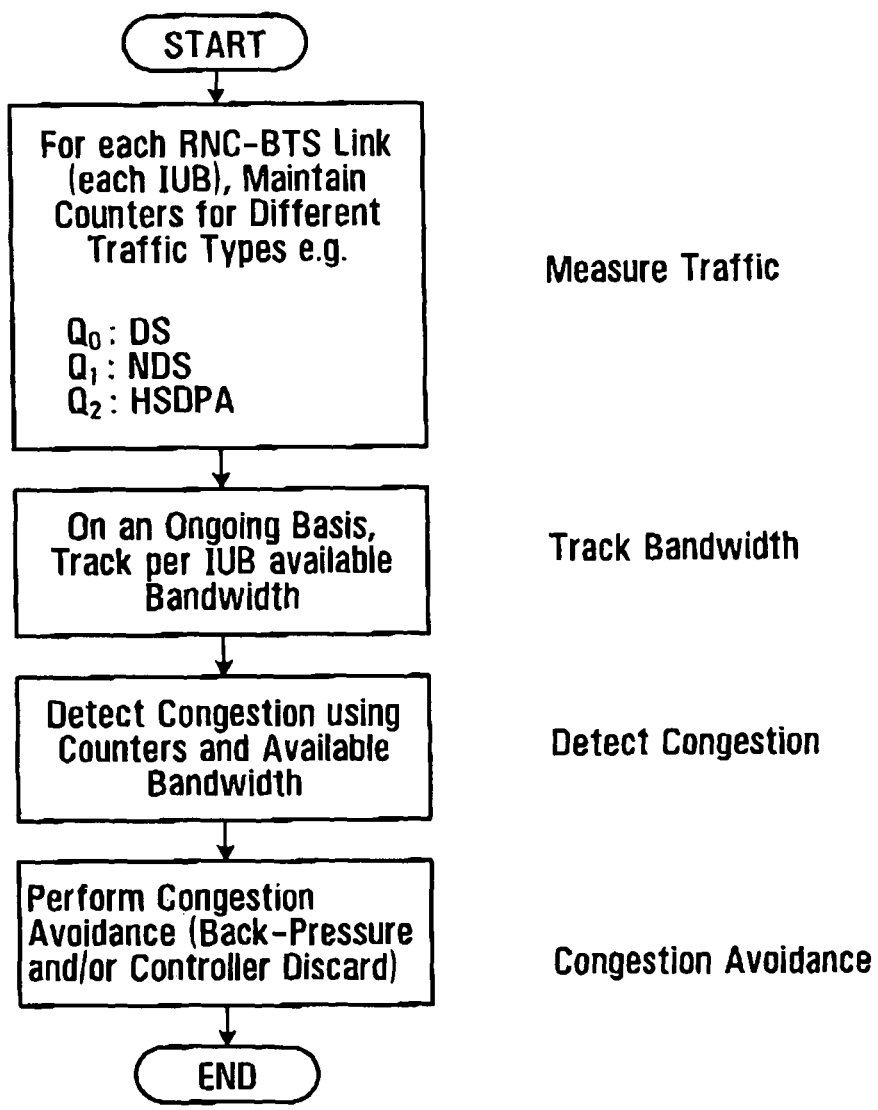
FIG. 2 is a flow chart of a method of congestion management.

Referring now to FIG. 2, shown is a flowchart of a method of dealing with the congestion on the lower speed links between the ATM network and the base stations. This method can be implemented using the congestion management functions 25,26,27,28 of FIG. 1 to deal with congestion on the links 15, but can also be implemented in more general network settings. The method begins at step 2-1 with measuring the amount of traffic received for transmission to each BTS (equivalently for UTRAN systems, the amount of traffic for each Iub), for example using the traffic measurement function 25 of FIG. 1. This can be done for example by maintaining a set of counters for each BTS. The counters are maintained in the context of multiple different traffic priorities. A counter is maintained for each priority. In the example that follows, the traffic priorities are DS for which a Q0 is maintained, NDS for which a counter Q1 is maintained, and HSDPA for which a counter Q2 is maintained. More generally, if a larger or smaller number of priorities are implemented, a different number of counters can be maintained. Detailed example implementations are described below.

Step 2-2 involves tracking the available bandwidth on each of the lower speed links, for example using the bandwidth tracker 26 of FIG. 1. This is done as often as necessary to keep an accurate current measurement of available bandwidth. For example, this can be done in response to network events e.g. low speed link failure, low speed capacity increase, link recovery so that a current measurement of the available bandwidth is available. Detailed example implementations are described below.

Step 2-3 involves performing congestion detection for each lower speed link using the counters and the available bandwidth information, for example using the congestion detector 27 of FIG. 1. Detailed example implementations are described below.

Step 2-4 involves performing congestion avoidance steps. In some implementations, this includes stopping traffic in a prioritized manner, for example using the congestion avoidance function 28 of FIG. 1. For example, for the DS,NDS, HSDPA traffic types, this might involve stopping NDS and/or HSDPA traffic for the particular RNC-BTS links. Detailed example implementations are described below.

Advantageously, this approach can be used to ensure that packets arrive within a specified window, bandwidth wastage can be reduced or eliminated; and when there is congestion, there is a mechanism for dealing with it. Details of particular implementations of each of these steps will now be provided.

Traffic Measurement

The traffic measurement function measures the amount of traffic of each traffic category that is being transmitted on each Iub. Conventional mechanisms exist for mapping each incoming stream to one of the Iub, and for determining the traffic category of stream. Thus, one example method of measuring the traffic is to examine each incoming packet, determine the Iub and traffic category that it belongs to, and increment the appropriate counter. In some embodiments, the counters are maintained in terms of ATM cell counts, and as such, if the incoming packets are IP packets, the number ATM cells for a given IP packet can be determined from the length of each packet. For the specific example, the categories include DS, NDS, and HSDPA, and as such counters can be maintained for each of these traffic categories, and for each Iub. For each Iub let Q0 be the counter for DS traffic, Q1 be the counter for NDS traffic, and Q2 be the counter for HSDPA traffic. More generally, if there are N Iub, and M traffic categories, there would be N×M counters being maintained.

In some embodiments described below, thresholding is performed on the basis of combined traffic categories. Traffic for such combined categories can be measured either by simply adding the counters of, the respective categories, or by maintaining a separate counter for the combined category. In the particular implementation described below, thresholding is performed on the basis of the combination of traffic categories as follows: DS, combined DS+NDS, and combined DS+NDS+HSDPA.

Bandwidth Tracking

Figure 3:
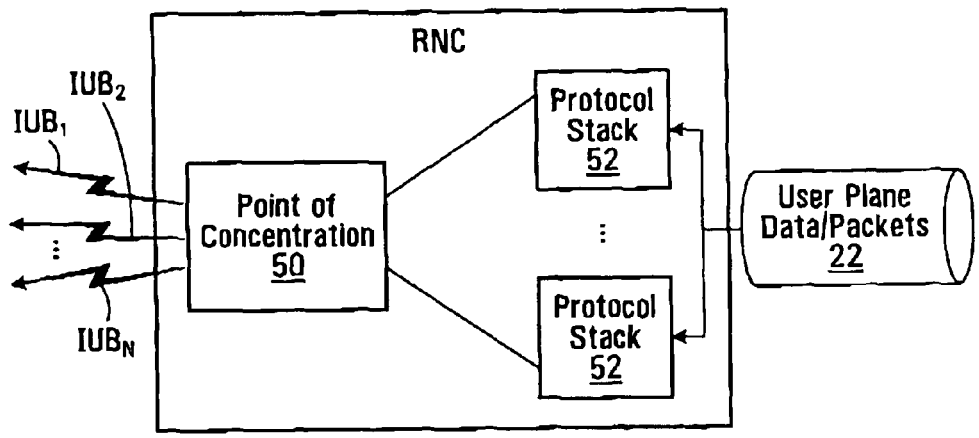
FIG. 3 is a block diagram of an example functional layout of the radio network controller of FIG. 1.

Further details of an example RNC implementation will now be described with reference to FIG. 3. Incoming traffic is shown arriving on a link 22 to a core network (not shown). The RNC implements a protocol stack 52 for each incoming data stream. The particular protocol stack will depend upon the system specification. It might for example be a 3GPP protocol stack. Note that at least one respective stream would be present for each mobile station being served, and that some mobile stations may have multiple such streams. The protocol stack might consist of RLC (radio link control), MAC (media access control) and FP (frame processing) layers, among others, for example. Each such protocol stack has the capability of queuing received packets. The received packets might be IP packets for example. The protocol stacks 52 all feed into a point of concentration 50, this being a single point of concentration for all Iub traffic.

While a respective protocol stack is shown for each incoming data stream, this is to be considered a logical view. In practice, it is possible that a number of processing engines are implemented each of which are capable of handling multiple such protocol stacks. A message to a particular protocol stack would then be implemented as a message to the particular processing engine for processing the next time it implements that particular stack. The protocol stacks are referred to as RABs in UTRAN implementations and there can be DS RABs, NDS RABs, and HSDPA RABs.

Figure 4:
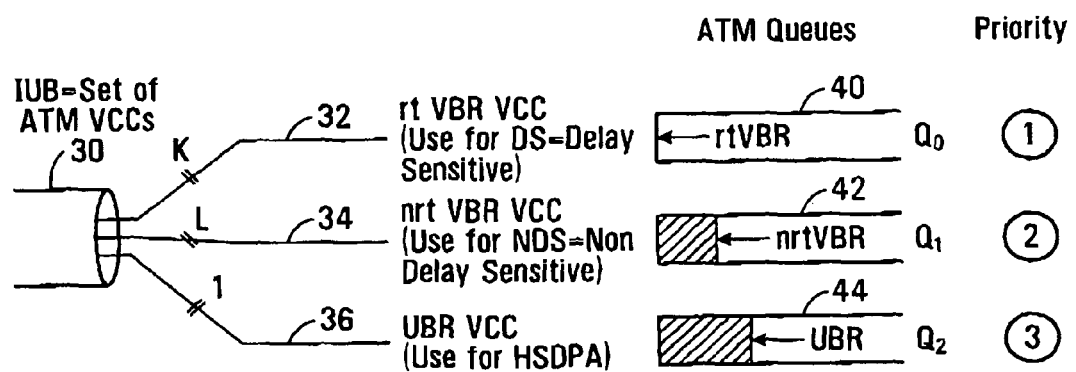
FIG. 4 depicts the breakdown of traffic on an Iub interface in terms of ATM VCCs.

The Iub bandwidth can change over time because one or more of the links to a given base station can go down and/or recover, and/or one or more VCCs traversing the ATM network can go down/recover. Referring now to FIG. 4, each Iub can be thought of as a set of ATM VCCs. An Iub is depicted abstractly at 30 to consist of a set of K rtVBR VCCs 32 used for DS traffic, a set of L nrtVBR VCCs 34 used for NDS traffic, and a single UBR VCC 36 used for HSDPA traffic. Each VCC has a respective SCR (sustained cell rate) and PCR (peak cell rate). The SCR and PCR are typically provisioned within the system. This information is typically contained in the ATM TD (ATM traffic descriptor).

ATM Traffic descriptors are typically stored in RNC and have been used to calculate available Iub bandwidth for the purpose of call admission control. Here, this calculated bandwidth is used to estimate the queuing delay of each stream of data sent towards the BTS. It is assumed that the links between the BTSs and the ATM Network are the queuing bottlenecks, therefore traffic descriptors must reflect the real bandwidth of this link.

The lower speed link to a given BTS might for example be implemented using a set of n×DS1 links. The approximate capacity of a DS1 link is 3628 ATM cells/second. Typically provisioning allows these VCCs to occupy up to some percentage of the total bandwidth so that there is some remaining bandwidth, e.g. 10%, for signaling purposes.

If one or more (IMA) DS1/E1 links go down (for example a DS1 goes down), the corresponding VCCs will be released and the total Iub bandwidth (expressed by sum of $VCC_{ECR}$) will be decreased appropriately. An ECR (equivalent cell rate) is determined for each Iub by summing VCC capacity over only the active VCCs. An example equation for determining the ECR for 10 ms period is as follows:

$$ECR = (\Sigma(VCC_{ECR}/100) \text{ where } VCC_{ECR} = 2*(PCR*SCR)/(PCR+SCR).$$

The ECR is a measure of the available link bandwidth (LB) for each Iub. More generally, for an arbitrary update interval, the bandwidth can be determined as follows:

$$LB = ECR(T_{update}/1 \text{ s})\Sigma(VCC_{ECR}) \text{ where } VCC_{ECR} = 2*(PCR*SCR)/(PCR+SCR).$$

where $T_{update}$ is the update interval, and PCR is a peak cell rate of a given active VCC, and SCR is a sustained cell rate of a given active VCC. Preferably, Iub bandwidth is updated only when the status of composite VCCs changes (due to link up/down event).

In some implementations, when a VCC goes down due to network outage or IMA bandwidth reduction, the RNC is notified by the ATM system by means of F5 OAM AIS/RDI cells. The RNC renders such VCCs "down", and reduces the Iub bandwidth accordingly. On VCC/Network/Link/IMA recovery, ATM system stops sending AIS/RDI, the RNC activates VCCs and increases the Iub bandwidth by values calculated from traffic descriptors. As a consequence, the RNC always has up-to-date knowledge of available Iub bandwidth.

Congestion Detection

Traffic is queued for transmission over the lower speed links. The traffic is queued on a priority basis. An example abstract depiction of a set of queues is shown in FIG. 4, where a first queue 40 queues DS traffic (using RTVBR VCCs), a second queue 42 queues NDS traffic (on NRTVBR VCCs), and a third queue 44 queues HSDPA traffic (on UBR VCCs). A respective set of such queues is implemented for each Iub. For the example of FIG. 1, these queues would be implemented in the ATM switch 14. Another corresponding set of queues might be implemented in the RNC, but congestion over the high speed link 13 is typically not a problem so these queues will not be discussed further. The counters Q0,Q1,Q2 maintained by the traffic measurement function 25 are intended to reflect the contents of these queues.

The traffic measurement function performs processing to update its perspective of the contents of these queues, i.e. to update Q0,Q1,Q2 to reflect traffic that has been sent downstream from the RNC. The previous discussion has focussed on adding to these counters when new traffic arrives. However, the counters need to be decremented when traffic has been transmitted. This might be done periodically, for example every 10 ms, or to some other suitable frequency. The counters collectively can be decremented by an amount equaling the calculated link bandwidth (LB), for example the above-discussed ECR. The counters are decremented in stages to reflect the transmission priority, and in a manner that does not allow any of the counters to become negative.

Q0 update: every update period, Q0 is decremented to zero by an amount D1=Q0. The remaining link bandwidth is LB−D1. This reflects the fact that DS traffic is given the highest priority. This also assumes that DS traffic will never exceed the link bandwidth as it is regulated at Connection Admission Time.

Q1 update: every update period, Q1 is decremented by D2=the lesser of (Q1, LB−D1). The remaining link bandwidth is LB−D1−D2, possibly equal to zero. This reflects the fact that NDS traffic is given the second highest priority.

Q2 update: if there is any remaining link bandwidth, i.e. LB−D1−D2>0, then Q2 is decremented by D3=lesser of {Q2, LB−D1−D2}. This reflects the fact that HSDPA traffic is given the lowest priority.

Thresholds are then used to determine if the updated Q values are too large and to declare congestion conditions accordingly. Thresholds can be defined as a function of the type of congestion avoidance to be implemented. Congestion is "detected" once one or more counters exceed the thresholds as defined. Thresholds define the maximum queuing delay allowed for a given traffic type.

Congestion Avoidance

Having determined that there is or will be a congestion problem, the system then takes steps to deal with it. The response of the system to each of these congestion conditions can be different.

Two different examples of congestion avoidance are detailed below, namely back-pressure, and controlled discard. With back-pressure, congestion conditions are anticipated, and messages are used to instruct certain streams (protocol stacks) to stop transmitting for some time. With controlled discard, when congestion conditions are detected, discards are performed in the protocol stacks at the RNC rather than in downstream BTSs after bandwidth has already been wasted. Either or both of these congestion avoidance mechanisms can be included in a given implementation. Another implementation is described that features both mechanisms.

Controlled Discard Congestion Avoidance

With controlled discard, excessive traffic (that which exceeds thresholds defined below) is discarded at the RNC entry point (the protocol stacks) rather than at the base station, eliminating wastage of Iub bandwidth, and controlling potential network queuing delay.

Three discard thresholds are defined for controlled discard (CD) congestion avoidance, and these will be referred to as TH0_CD, TH1_CD, and TH2_CD.

TH0_CD is nominally set to equal the link bandwidth over a 10 ms period, using the most recently calculated link bandwidth. This is the same as the maximum amount that can be queued in Q0 before there is a congestion problem. This should never be a problem if call admission control is performed properly, and DS traffic is given top priority. Because of this, DS traffic should always be able to get transmitted within the window. As such, Q0 should never experience a problem with congestion. For the particular method of calculating bandwidth introduced above:

$$Th0 = (\tau(VCC_{ECR}/100) \text{ where } VCC_{ECR} = 2*(PCR*SCR)/(PCR+SCR).$$

TH1_CD is set to the maximum amount allowed in Q0+Q1 before declaring a TH1_CD congestion problem; Th1_CD determines the maximum number of Q0+Q1 (DS+NDS) traffic that may be in transfer on an Iub link. This traffic may be either en-queued on ATM buffers and in transfer between the base station and RNC, or just received by a base station within this 10 ms period.

As an example of TH1_CD definition, when only (hypothetically) NDS traffic is transmitted, TH1_CD can be defined to represent the maximum burst of data that may be sent to base station within a 10 ms time, or that may be queued up on Iub ATM Queue. Every 10 ms (as Q0−Th0_CD<0 is always true in this case), the next burst of data would be sent towards the base station as long as the real time counter Q1 is smaller than Th1_CD. When DS and NDS traffic is sent to the base station, the NDS traffic/burst within this 10 ms cannot exceed Th1−Q0. In some implementations, a further counter Q0pr counts on DS traffic sent within last 20 ms. This data is used to estimate traffic to be sent within next 10 ms. NDS traffic cannot exceed min(Th1−Q0pr,Th1−Q0)

TH2_CD is set to the maximum amount allowed in Q0+Q1+Q2 before declaring a TH2_CD congestion problem; Th2_CD determines the maximum number of Q0+Q1+Q2 (DS+NDS+HSDPA) traffic that may be in transfer on Iub link. This traffic may be either en-queued on ATM buffers and in transfer between the base station and RNC, or just received by the base station within this 10 ms period. As an example of TH2_CD definition, when only HSDPA traffic is present, Th2_CD can be defined to represent the maximum burst of data that can be sent in 10 ms towards the base station.

Using the above-defined discard thresholds, the following discard behaviour is implemented:

DS—never discard;

NDS—discard when Q0+Q1 exceeds TH1_CD;
HSDPA—discard when Q0+Q1+Q2 exceeds TH2_CD.

The manner in which discarding is then implemented is implementation specific. In one example, once discarding commences, all data of given service category is discarded until the end of this 10 ms interval. At the beginning of the next 10 ms interval the following actions are taken:

If Q0−TH0_CD<0, NDS traffic transmission is resumed in next 10 ms period.

If Q0+Q1−Th0_CD<0, HSDPA traffic transmission is resumed in the next 10 ms.

Back-Pressure Congestion Avoidance

The back-pressure mechanism provides a local to RNC back-pressure mechanism between Iub concentration points (PC) and the protocol stacks. This option uses the same real time counters as discussed above for the controlled discard mechanism. Back-pressure thresholds are defined as follows:

Two thresholds are defined for back-pressure (BP) congestion avoidance, and these will be referred to as TH1_BP, and TH2_BP:

TH1_BP is set to the maximum amount allowed in Q0+Q1 before applying back-pressure to NDS traffic. This is preferably set to equal some percentage of the above-defined controlled discard threshold TH1_CD, for example 90%;

TH2_BP is set to the maximum amount allowed in Q0+Q1+Q2 before applying back-pressure to HSDPA traffic. This is preferably set to equal some percentage of the above-defined controlled discard threshold TH2_CD, for example 90%.

When Th1_BP is crossed, a message is sent to all NDS RAB PMCs (i.e. all streams) instructing them to stop sending data for some time on this Iub. Such messages are to be considered logical in nature. For example, they might be physically transmitted on a control bus within the RNC, or simply be datafilled into memory locations that can be read by the appropriate functions. This effectively blocks the RLC layer of the RABs that receive the message. This is sent to NDS RABs for that Iub only. The message either has a default stop time, or specifies how long to stop. This might be specified in multiples of the update period. This would be in multiples of 10 ms for the 10 ms update period example.

When TH2_BP is crossed, a similar message is sent to HSDPA RABs for that Iub only, again indicating how long HSDPA RAB RLC protocol layers are to stop transmitting.

When TH1_BP and TH2_BP are both crossed, a message is sent to both the NDS RABs and the HSDPA RABs.

It is noted that TH1_BP and TH2_BP are independent and can be crossed separately or together.

Each RAB, upon receipt of one of the above messages, stops forwarding traffic for the default or specified time period. The thresholds and time periods are selected such that only as much traffic arrives at the ATM switch for transmission over each lower speed link as can be carried on such links. As such, theoretically there should be no discards at all. Depending on implementation of congestion detection mechanism, some discards may still happen due to bandwidth being allocated to higher priority traffic, in excess of anticipated traffic shared between DS, NDS and HSDPA. The ideal congestion detection mechanism adjusts dynamically to higher priority traffic load to control real time queuing of each traffic type. The RLC NDS traffic retransmission will only happen when traffic is discarded on Iub interface. Traffic discarding is substantially avoided by controlling queuing delay. These RABs will not transmit any data during the specified period for example by ignoring a number of TTI events. Transmission resumes at the end of such period. The data stays in RLC queue for this period of inactivity. New data may be delivered to RLC queues, but eventually either the end-point application window closes, or RLC window closes, or PDCP/RLC queue overflows. There are existing mechanisms such as TCP congestion management for dealing with this condition that are outside the scope of this invention.

This mechanism implements virtual traffic pacing/shaping at the RNC, avoiding unnecessary RLC PDU discards and subsequent retransmits. It is expected that this mechanism would provide smooth and stable congestion control to end users.

Combined Controlled Discard and Back-Pressure Congestion Avoidance

In another embodiment, both the controlled discard and back-pressure congestion avoidance mechanisms described above are implemented simultaneously. The following are an example set of default threshold definitions for such a combined mechanism:

Th0_CD=$EVCC_{ECR}$
Th1_CD=4*Th0_CD
Th2_CD=6*Th0_CD
TH1_BP=90% of Th1_CD
TH2_BP=90% of Th2_CD

The stop period for NOS can be defined as the time equivalent to TH1_CD/2 (20 ms for the particular example)—rounded up.

The stop period for HSDPA can be defined as the time equivalent to Th2_CD/2 (30 ms for the particular example)—rounded up.

The best values of these thresholds for a given implementation will likely need to be determined through testing.

The following is a set of example thresholds that might be suitable for systems that implement shaped VPTs:

TH0_CD=$\Sigma VCC_{ECR}$
TH1_CD=2*TH0_CD
TH2_CD=3*TH0_CD
TH1_BP=90% TH1_CD
TH2_BP=90% Th2_CD
NDS stop transmit period=10 ms
HSDPA stop transmit period=20 ms Two particular congestion avoidance mechanisms have been taught. More generally, in some embodiments any congestion avoidance mechanisms can be employed.

Numerous modifications and variations of the present invention are possible in light of the above teachings. It is therefore to be understood that within the scope Of the appended claims, the invention may be practiced otherwise than as specifically described herein.

The invention claimed is:

1. A method for managing congestion in a network comprising an RNC (radio network controller) and a plurality of base stations over links comprising at least one respective link that is remote from the RNC for each base station, the method comprising:

measuring incoming traffic for each base station at the RNC of a plurality of traffic classes to produce traffic measurements;

for each base station, determining a total bandwidth available on the at least one respective link to the base station that is remote from the RNC and is along a signal path between the RNC and base station, said signal path including at least one other link having different characteristics from said respective link, and a transport component coupling said respective link and said at least one other link;

for each base station, detecting presence or absence of a congestion condition using the traffic measurements for the base station and the determined total bandwidth available on the at least one respective link to that base station; and upon detecting the congestion condition, performing congestion avoidance at the RNC.

2. The method of claim 1 wherein:

for each base station, determining the total bandwidth available on the at least one respective link to the base station is done upon occurrence of an event that effects the total bandwidth available.

3. The method of claim 1 wherein said step of measuring incoming traffic for each base station comprises:

for each incoming packet, determining which link the packet will be transmitted on, and determining a traffic class for the packet, and incrementing a counter for the determined traffic class and link.

4. The method of claim 3 further comprising converting a size of the packet to a cell count, and incrementing a counter by the cell count.

5. The method of claim 3 wherein the traffic classes comprise DS (delay sensitive), NDS (non delay sensitive), and HSDPA (High speed downlink packet access).

6. The method of claim 5 wherein said step of detecting presence or absence of congestion conditions comprises:

every update period, updating the traffic measurements for DS, NDS and HSDPA to reflect traffic that has been transmitted;

comparing traffic balances of each of:
a) DS traffic to a first discard threshold;
b) DS+NDS traffic to a second discard threshold and first back-pressure threshold;
c) DS+NDS+HSDPA traffic to a third discard threshold and a second back-pressure threshold.

7. The method of claim 1 wherein determining a respective total bandwidth available on each link comprises:

adding up capacities of all active VCCs on the link.

8. The method of claim 7 wherein adding up capacities of all active VCCs on the link comprises computing:

$$LB=(T_{update}/1\ s)\Sigma(VCC_{ECR})\ \text{where}\ VCC_{ECR}=2*(PCR*SCR)/(PCR+SCR),$$

where $T_{update}$ is the update interval, and PCR is a peak cell rate of a given active VCC, and SCR is a sustained cell rate of a given active VCC.

9. The method of claim 1 wherein for each base station, said step of detecting presence or absence of a congestion condition comprises:

every update period, updating the traffic measurements to reflect traffic that has been transmitted, comparing traffic balances of traffic classes or combinations of the traffic classes to respective thresholds.

10. The method of claim 9 wherein said updating and comparing step comprises:

comparing traffic balances of each of:
a) highest priority traffic;
b) sum of traffic of top two priorities;
c) sum of traffic of top three priorities;
to a respective at least one threshold.

11. The method of claim 10 wherein the respective at least one threshold comprises a discard threshold.

12. The method of claim 10 wherein the respective at least one threshold comprises a back-pressure thresholds.

13. The method of claim 10 wherein the respective at least one threshold comprises a controlled discard threshold and a back-pressure threshold.

14. The method of claim 1 wherein performing congestion avoidance at the RNC comprises at least one of:

performing controlled discards; and
applying back-pressure.

15. The method of claim 14 wherein performing controlled discards comprises:

discarding all traffic in excess of an exceeded controlled discard threshold.

16. The method of claim 14 wherein applying back-pressure comprises:

for a specified time period stopping transmission of a respective traffic type when a back-pressure threshold is exceeded.

17. A radio network controller (RNC) for performing congestion management of traffic transmitted towards a plurality of a base stations over links comprising at least one respective link that is remote from the RNC for each base station, the radio network controller comprising:

a congestion management function comprising:
a) a traffic measurement function for measuring incoming traffic destined for each base station;
b) a bandwidth tracker for tracking an available bandwidth for transmission to each base station on the respective link that is remote from the RNC and is along a signal path between the RNC and said each base station, said signal path including at least one other link having different characteristics from said respective link, and a transport component coupling said respective link and said at least one other link;
c) a congestion detector for detecting congestion using the traffic measurements and the tracked available bandwidth;
d) a congestion avoidance function for, upon detecting a congestion condition on the at least one respective link to a particular base station, performing congestion avoidance at the RNC.

18. The RNC of claim 17 wherein the congestion avoidance function performs congestion avoidance by applying back-pressure on selected streams for the at least one respective link upon which a congestion condition has been detected.

19. The RNC of claim 17 wherein the congestion avoidance function performs congestion avoidance by performing controlled discards on selected streams for the at least one respective link upon which a congestion condition has been detected.

20. The RNC of claim 19 wherein the congestion avoidance function performs congestion avoidance by applying back-pressure on selected streams for the at least one respective link upon which a congestion condition has been detected.

21. A UTRAN (UMTS terrestrial radio access network) comprising:

the RNC of claim 17;
an ATM network;
a high speed link interconnecting the ATM network and the RNC; and
a plurality of base stations, the at least one respective link interconnecting the ATM network to each of the plurality of base stations.

* * * * *